Sept. 16, 1969  E. M. DEXTER  3,467,125
SYSTEM FOR MEASURING FLUID PRESSURE
Filed Jan. 11, 1967
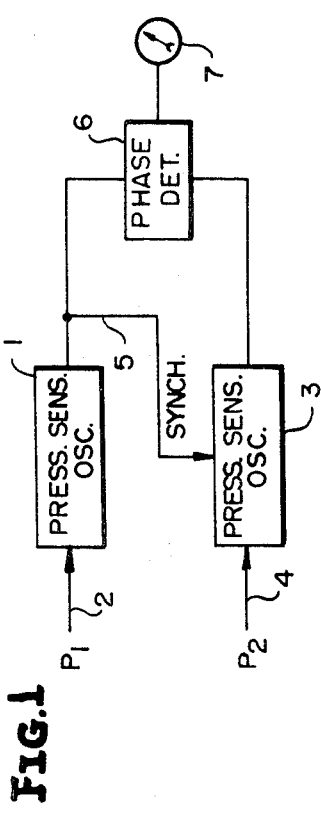
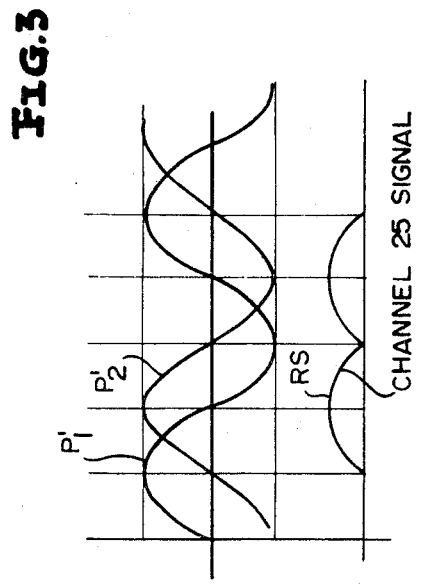
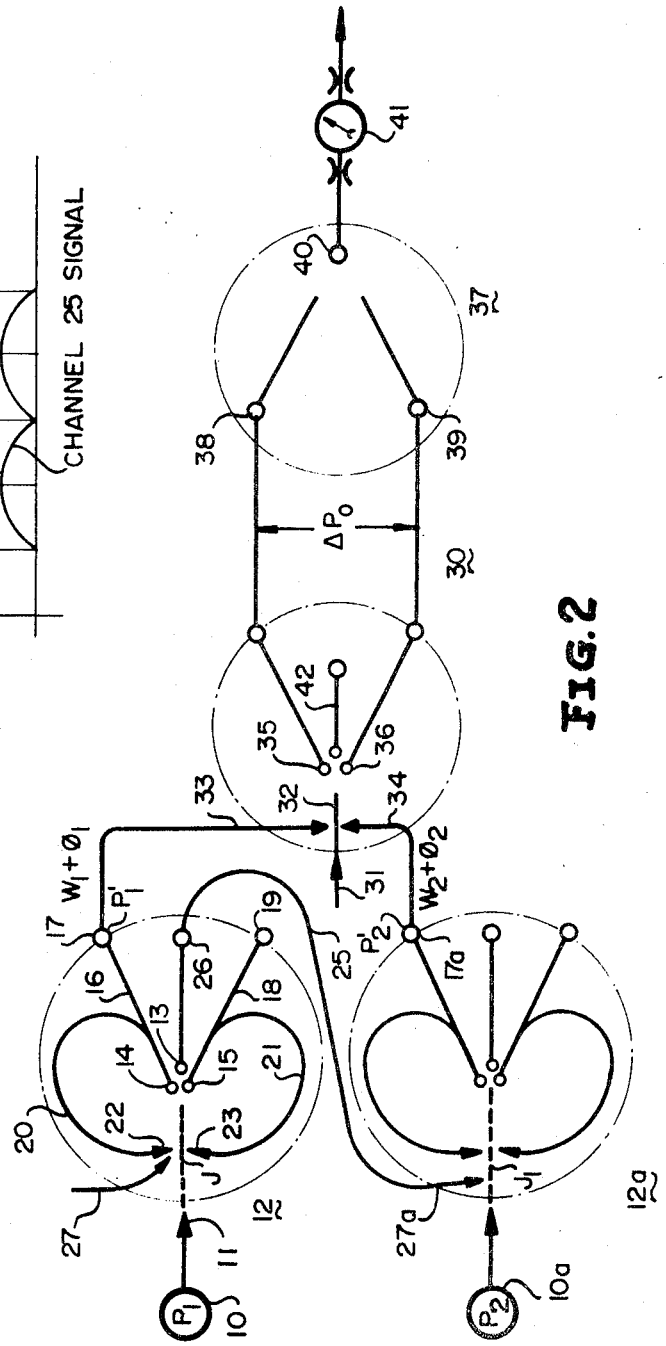
INVENTOR
Edwin M. Dexter United States Patent Office 3,467,125
Patented Sept. 16, 1969

3,467,125
SYSTEM FOR MEASURING FLUID PRESSURE
Edwin M. Dexter, Silver Spring, Md., assignor to Bowles Engineering Corporation, Silver Spring, Md., a corporation of Maryland
Filed Jan. 11, 1967, Ser. No. 608,622
Int. Cl. F15c 1/12, 1/14
U.S. Cl. 137—81.5                              14 Claims

ABSTRACT OF THE DISCLOSURE

Differential pressure is measured by applying diverse pressures to separate fluidic pressure controlled oscillators, respectively, and loosely coupling the oscillators so that they are frequency synchronized but not phase locked. The phase difference of the oscillations is then a function of differential pressure, and is measured by applying the oscillations to an analog amplifier acting as a phase detector. The oscillations can be adjusted to have 90° phase difference, or some other predetermined phase difference, when the pressures are equal, which provides a reference output. Phase deviation with respect to the reference may then be measured as an indication of pressure differential.

Background of the invention

The present system utilizes the fluidic pressure controlled oscillator disclosed in application for U.S. Patent Ser. No. 430,696, filed Feb. 5, 1965, in the name of Francis M. Manion, and assigned to the assignee of the present application. Two such oscillators may be coupled in such manner that their frequencies are synchronized, but the relative phase of the oscillator outputs is subject to variation as the main jet pressure applied to one varies with respect to the main jet pressure applied to the other. The Manion application discloses that the natural frequency of a fluidic oscillator employing feedback is a function of main jet pressure, since this pressure affects time delay in the feedback path. It is known that two such oscillators, though subjected to diverse main jet pressures, so that they tend to oscillate at diverse frequencies, may be frequency locked by coupling the oscillators. It has not heretofore been discovered that such oscillators will not be phase locked, if the coupling is relatively loose, and that phase difference of the oscillators is a monotonic measure of pressure differences at the main jets. This phase difference may be measured by a fluidic circuit.

Summary of the invention

The invention relates generally to fluidic systems and more particularly to fluidic systems for measuring pressure differential, by controlling fluidic pressure sensitive oscillators according to the two pressures establishing the differential, loosely coupling the oscillators to establish frequency lock without phase lock, and measuring the phase difference of the outputs of the oscillators.

Brief description of the drawings

FIGURE 1 is a block diagram of a system according to the invention;
FIGURE 2 is a schematic circuit diagram of a specific embodiment corresponding with the block diagram of FIGURE 1, and
FIGURE 3 is a wave form diagram useful in explaining the system of FIGURE 2.

Description of the preferred embodiments

In FIGURE 1, 1 is a first fluidic self excited oscillator having a natural frequency $\omega_1$ which is a function of fluid pressure $P_1$ applied to the oscillator 1 via channel 2. 3 is a second fluidic self excited oscillator having a natural frequency $\omega_2$ which is a function of fluid pressure $P_2$ applied to the oscillator 3 via channel 4. The two oscillators 1 and 3 are coupled via a loose coupling link 5, which serves to control $\omega_2$ to equal $\omega_1$, but is not sufficiently strong to accomplish phase locking as well as frequency locking and therefore permits a variation of phase $\theta_2$ of oscillator 3 with respect to phase $\theta_1$ of oscillator 1, leaving a phase difference $\theta_3 = \theta_2 - \theta_1$.

The phase difference of the outputs of the oscillators 1 and 3 is measured by a fluidic phase detector 6, the output of which is indicated by a phase indicator 7.

A specific embodiment of the system illustrated as a block diagram in FIGURE 1, is illustrated schematically in FIGURE 2.

In FIGURE 2, 10 is a source of fluid under pressure $P_1$, which is connected to a first power nozzle 11 of a fluidic oscillator 12. Located downstream of power nozzle 11 are three fluid collection ports, a central port 13 aligned with the fluid jet J issuing from the power nozzle 11, and ports 14 and 15 located respectively on opposite sides, left and right, of port 13, to collect fluid when the fluid jet is deflected left or right, respectively. Port 14 is the input of a passage 16 which terminates in an output port 17. Port 15 is the input of a passage 18 which terminates in an output port 19. Feedback loops 20 and 21 extend from passages 16, 18, respectively, to control nozzles 22, 23, respectively, which issue control fluid tending to cause deflection of jet J. The feedback loops 20, 21 each contains fluid inertance and fluid capacitance, introducing a phase delay or time delay in proceeding along the loops, and the oscillator 12 is, as a consequence unstable or oscillatory, at a frequency for which net phase delay is 180°, the term net phase delay meaning phase delay in the feedback loop, plus phase delay which may occur in proceeding from nozzle 11 to ports 14, 15 and along channels 16, 18 to the entrances of the feedback loops.

Oscillators employing feedback are inherently pressure sensitive, because transport time of fluid in the oscillators is a function of pressures available. Therefore, if port 17 is taken as an output port, a sine wave of pressure will appear, superposed on a DC level, at frequency $\omega_1$, for which a 180° feedback shift occurs. The oscillator 12 is known in the art as a pressure controlled oscillator (PCO) and is discussed in detail in application for U.S. Letters Patent Ser. No. 430,696, filed Feb. 5, 1965, in the name of Francis M. Manion, and entitled "Pressure Controlled Oscillators." That application and the present application are assigned to a common assignee.

A second oscillator 12a, is provided, which may be driven from a source 10a, at pressure $P_2$. Corresponding parts of oscillators 12 and 12a may be identified by the same reference numerals except in that reference numerals applied to oscillator 12a carry the subscript a.

A fluid channel 25 conveys fluid from the output port 26 of oscillator 12, to a control nozzle 27a of oscillator 12a. The character of the wave form of the flow in channel 25 depends on the design details of the oscillator, and essentially on the width of the entrance to the channel 13. But, at least to a first approximation, a rectified sine wave of pressure RS (FIGURE 3) may travel along channel 25, which has one peak 90° advanced and one peak 90° retarded with respect to the pressure peak at output port 17, in that zero pressure arrives at output port 26 at the times of peak pressure arrivals at ports 17 and 19, as the jet J is deflected in oscillatory fashion. Oscillator 12a tends to oscillate at its own frequency, established by the pressure $P_2$. However, the coupling between oscillators 12 and 12a, via channel 25, serves to synchronize the frequency of oscillator 12a to the frequency of oscillator 12. However, the oscillator 12a may have a natural frequency which is not the same as the frequency of oscillator 12, and the frequency divergence displays itself as a phase difference, as the oscillator 12a tends or attempts to pull away from oscillator 12 in frequency.

Assuming zero phase delay in channel 25, the oscillators 12 and 12a will have a phase difference of $$\theta_1 - \theta_2 = 90° = \theta_3$$

for the configuration illustrated and for identical natural frequencies of the oscillators. This difference will in fact be different from 90° as a function of phase delay in channel 25, but that phase delay may be made small by shortening the length of the channel 25. Phase delays different than those described are available in synchronizing signal is derived from port 19, for example.

If $P_1 = P_2$ a pressure pulse will arrive at control nozzle 27a in time to reinforce a pressure pulse arriving via feedback channel 20a, and the oscillators will be fully synchronized in frequency, and will have a phase difference of 90° as in FIGURE 2. As the pressure $P_2$ increases with respect to the pressure $P_1$, 12a tends to oscillate at a higher frequency, i.e., $\omega_2$ tends to go higher than $\omega_1$. This has the effect of increasing $\theta_3$. On the other hand, if $\omega_2$ is naturally lower than $\omega_1$, $\theta_3$ tends to decrease.

In FIGURE 2, negative pressures, in oscillator 12, occur by definition when the jet J is predominantly directed to port 15, and positive pressure when jet J is directed directly into port 14. Full jet deflection implies maximum $P_1$ and zero jet deflection implies a zero value of $P_1$. Maximum pressure in channel 13 occurs, however, whenever the jet J is undeflected.

So long as the natural value of $\omega_1$ and $\omega_2$ are equal, synchronizing pressure is a maximum when feedback pressure is at a maximum, and the natural frequency of oscillator 12a and its phase remain unaffected by the coupling. When the natural frequency $\omega_2$ is not the same as $\omega_1$, the feedback pressure peaks do not coincide with the synchronizing pressure peaks. The timing or the initiation of each cycle is then the sum of the total pressures applied to the control nozzles 22a, 23a, 27a of the oscillator. It has then been found feasible to achieve a phase shift of about ±60° with respect to the normal 90° shift, i.e. to about 150° on one side and about 30° on the other, for a suitable range of pressures, in a smooth monotonic variation of phase shift with pressure differential, as $P_2$ varies above and below $P_1$.

The fact that the pressure in channel 25 represents a full wave rectified sine wave does not modify the operation as described, being predominant in the negative phase of $P_2'$.

Since the fed-back signal at each control nozzle is 180° out of phase with the output signal, both attain zero value together. If $\theta_1 = \theta_2$ the operative phase difference for $P_2'$ and for the channel 25 signal is zero, and therefore the oscillator 12a is phase locked to oscillator 12 and operating at the same frequency as oscillator 12. The channel 25 signal is superposed on the feedback signal for all other natural frequencies of oscillator 12a. The oscillator 12a is thus forced to oscillate, on average, at the frequency of the synchronizing signal, i.e., it cannot continually and progressively increase the phase differential or decrease the phase differential over many cycles of operation, as would be the case for two free running oscillators of diverse frequencies. The attempt of the oscillator 12a to depart progressively from the phase zero set by oscillator 12 is the phenomenon which gives rise to a steady phase difference.

A suitable phase detector 30 includes in cascade a fluidic amplifier having a power nozzle 31 for producing a fluid jet 32. Control nozzles 33 and 34 are disposed on opposite sides of jet 32, to which are applied the fluid signals $\omega_1 + \theta_1$ and $\omega_2 + \theta_2$; $\omega_1 = \omega_2$, but in general $$\theta_1 \neq \theta_2$$

The jet 32 is differentially received by collector ports 35, 36, which lead to a full wave fluidic rectifier 37. The latter consists of two nozzles 38, 39, which point to a single collector port 40. The latter leads in turn to a meter 41, such as a pressure gauge or the like.

To an approximation, and for example, if $$\theta_1 - \theta_2 = 180°$$

maximum deflection of jet 32 will occur at frequency $\omega_1$, maximum peak signals will be collected by ports 35 and 36 and therefore maximum rectified signal by collection port 40. If, however, $\theta_1 = \theta_2$, there will be no main jet deflection and the entire main jet is dumped via center channel 42 so that no flow reaches the rectifier input ports 38, 39.

It is well understood that the difference of two sine waves of the same frequency is a sine wave having a peak amplitude which is a function of phase separation of the waves. For zero phase, assuming equal wave amplitudes, the difference wave amplitude is zero and for 180° phase difference the difference wave amplitude is the sum of the amplitudes. For intermediate phase differences the difference wave amplitude is intermediate, and it is the full wave rectification of this difference wave which is indicated by meter 41.

What is claimed is:

1. In a fluidic system for measuring differential pressure,
    a first fluid pressure controlled self-excited oscillator,
    a second fluid pressure controlled self-excited oscillator,
        said fluid pressure controlled oscillators having equal natural frequencies when the pressures applied thereto have a predetermined pressure difference,
    means coupling said first fluidic pressure controlled oscillator to said second fluidic pressure controlled oscillator with sufficiently close coupling to lock frequencies but to substantially affect but not to lock phasing of said oscillators,
    each of said fluidic pressure controlled oscillators having a natural oscillatory frequency which is a function of fluid pressure applied thereto,
    whereby the phase difference of the natural oscillations of said oscillators is a function of the difference of said fluid pressures.

2. The combination according to claim 1 wherein is provided means for measuring said phase difference.

3. The combination according to claim 1 wherein said predetermined pressure difference is zero.

4. A fluidic phase detector for two sine waves of frequency $\omega$ and phases $\theta_1$, $\theta_2$, respectively, comprising
    sources of said sine waves,
    a fluidic amplifier responsive to both said sine waves for developing a resultant sine wave having a peak amplitude which is a function of the relative values of phases $\theta_1$ and $\theta_2$, and
    means for full wave rectifying said resultant sine wave.

5. The fluidic phase detector according to claim 4 wherein:
    said two sine waves are respective first and second fluid pressure signals; and
    said fluidic amplifier comprises a power nozzle responsive to application of fluid pressure thereto for issuing a power stream of fluid, first and second control nozzles for receiving respectively said first and second fluid pressure signals and issuing respective first and second control streams as direct function of said first and second fluid pressure signals, and a pair of fluid receivers disposed to provide said resultant sine wave by differentially receiving said power stream as a function of power stream deflection.

6. The fluidic phase detector according to claim 5 wherein said means for full wave rectifying said resultant sine wave comprises:
    a pair of nozzles connected respectively to said pair of fluid receivers;
    a collector port;
    said nozzles being directed toward said collector port.

7. A fluidic circuit for measuring the pressure difference between first and second fluid pressure signals, comprising:
   a first pressure controlled oscillator including first and second outlet passages and an input port, said oscillator being responsive to application of said first fluid pressure signal to said inlet port for providing a first oscillatory fluid signal at said first outlet passage and a second oscillatory fluid signal at said second outlet passage, the frequencies of said first and second oscillatory fluid signals being synchronized and functions of said first fluid pressure signal, the phase relationship between said first and second oscillatory fluid signals being fixed;
   a second pressure controlled ocillator, including an outlet passage and first and second inlet ports, said second oscillator being responsive to application of said second fluid pressure signal to said first inlet port for providing a third oscillatory fluid signal at said outlet passage, the frequency of said third oscillatory fluid signal being solely a function of said second fluid pressure signal in the absence of a signal at said second inlet port, the frequencies of said first and third oscillatory fluid signals being equal for at least one predetermined pressure difference between said first and second fluid pressure signals, said second oscillator being responsive to application of an oscillatory fluid synchronizing signal to said second inlet port for synchronizing the frequency but not the phase of said third oscillatory fluid signal with the frequency of said oscillatory fluid synchronizing signal;
   frequency synchronization means for applying said second oscillatory fluid signal to said second inlet port of said oscillator as said oscillatory synchronizing signal;
   whereby the difference between said first and third oscillatory fluid signals is a function of the pressure difference between said first and second fluid pressures.

8. The fluidic circuit according to claim 7 further comprising means for measuring the phase difference between said first and third oscillatory fluid signals, said last mentioned means including:
   a fluidic amplifier responsive to both said first and third oscillatory fluid signals for developing a resultant oscillatory fluid signal having a peak amplitude which is a function of the relative phases of said first and third oscillatory fluid signals;
   means for full wave rectifying said resultant oscillatory fluid signal.

9. The fluidic circuit according to claim 7 wherein said pressure controlled oscillators are fluidic elements of the stream interaction type in which a power stream is cyclically deflected, said second inlet port of said second pressure controlled oscillator including a control nozzle responsive to said oscillatory fluid synchronizing signal for issuing a correspondiny oscillatory control stream in interacting relationship with the power stream of said second oscillator, and wherein said frequency synchronization means comprises a fluid passage interconnecting said second outlet port of said first oscillator and said control nozzle of said second oscillator, said fluid passage introducing a predetermined time delay in signals passing therethrough.

10. The fluidic circuit according to claim 9 wherein said second oscillatory fluid signal is a full wave rectified version of said lrst oscillatory fluid signal.

11. The fluid circuit according to claim 10 further comprising means for measuring the phase difference between said first and third oscillatory fluid signals, said last mentioned means including a fluidic amplifier responsive to both said first and third oscillatory fluid signals for developing a resultant oscillatory fluid signal having a peak amplitude which is a function of the relative phases of said first and third oscillatory fluid signals.

12. The circuit according to claim 11 further comprising means for full wave rectifying said resultant oscillatory fluid signal.

13. The circuit according to claim 12 wherein:
   said fluidic amplifier comprises: a power nozzle responsive to application of pressurized fluid thereto for issuing a power stream of fluid, a pair of substantially opposed control nozzles responsive to pressurized fluid applied thereto for issuing respective control streams for deflecting said power stream in opposite senses, a pair of fluid receivers disposed for differentially receiving said power stream as a function of power stream deflection;
   and wherein said means for measuring further comprises fluid passage means for applying said first and third oscillatory fluid signals to respective ones or said pair of control nozzles of said fluidic amplifier.

14. The circuit according to claim 13 wherein said means for full wave rectifying said resultant oscillatory fluid signal comprises:
   a pair of nozzles connected respectively to said pair of fluid receivers;
   a collector port;
   said nozzle being directed toward said collector port.

References Cited

UNITED STATES PATENTS

| | | | |
|---|---|---|---|
| 3,117,593 | 1/1964 | Sowers | 137—81.5 XR |
| 3,159,168 | 12/1964 | Reader | 137—81.5 |
| 3,185,166 | 5/1965 | Horton et al. | 137—81.5 |
| 3,228,410 | 1/1966 | Warren et al. | 137—81.5 |
| 3,273,377 | 9/1966 | Testerman et al. | 137—81.5 XR |
| 3,348,562 | 10/1967 | Ogren | 137—81.5 |

SAMUEL SCOTT, Primary Examiner